United States Patent [19]
Hewitt et al.

[11] 3,973,987
[45] Aug. 10, 1976

[54] WATER RECYCLE TREATMENT SYSTEM FOR USE IN METAL PROCESSING

[75] Inventors: David Edward Hewitt, Hopkinton; Thomas Joseph Dando, Southboro, both of Mass.

[73] Assignee: Data General Corporation, Southboro, Mass.

[22] Filed: Mar. 18, 1974

[21] Appl. No.: 452,475

[52] U.S. Cl. .............................. 134/12; 159/47 WL; 134/10; 134/109; 204/238; 210/23 H; 210/60; 210/73 R; 210/167; 210/253; 210/321 R
[51] Int. Cl.² .......................................... B08B 7/04
[58] Field of Search ................. 159/43 A, 47 WL; 134/10, 12, 18, 109–111; 204/235, 237; 210/23, 59, 60, 73, 74, 152, 167, 195, 202, 253, 256, 258, 259, 321

[56] References Cited
UNITED STATES PATENTS

| | | |
|---|---|---|
| 3,243,044 | 3/1966 | Moll .................................. 210/257 |
| 3,436,344 | 4/1969 | Canning et al. ....................... 210/39 |
| 3,528,901 | 9/1970 | Wallace et al. ....................... 210/23 |
| 3,542,651 | 11/1970 | Yagishita ............................. 204/237 |
| 3,640,331 | 2/1972 | Yagishita ........................... 159/43 A |

OTHER PUBLICATIONS
Oh & Hartley, "Recycling Plating Wastes . . ." *Products Finishing*, May 1972 pp. 90–96.

A. Golomb, "Application of Reverse Osmosis . . ." *Plating*, Apr. 1972, 316–319.

Primary Examiner—Thomas G. Wyse
Assistant Examiner—Peter A. Hruskoci
Attorney, Agent, or Firm—Jacob Frank; Joel Wall

[57] ABSTRACT

A water recycle treatment system comprising two main treatment sub-systems for treatment of contaminated water from a plurality of concentrated solutions and rinse baths to separate out the impurities therein. A first sub-system treats less concentrated solutions used for the rinse baths by channeling the flow therefrom to a first neutralizing tank which provides for pH control to produce a mixed output solution having a substantially constant pH factor, which is filtered to remove gross particles, the filtered solution being cooled in a holding tank and passed through a reverse osmosis process and carbon bed to produce clean water. The second sub-system treats highly concentrated solutions obtained from a plurality of chemical processes, mixes them in a second neutralizing tank which is utilized to produce a substantially constant pH output, which is fed to an evaporator to precipitate the metals and salts in sludge and also forms a water vapor output. The reverse osmosis waste is fed back into the second neutralizing tank and processed as noted above.

8 Claims, 2 Drawing Figures

WATER RECYCLE TREATMENT SYSTEM FOR USE IN METAL PROCESSING

BACKGROUND OF THE INVENTION

The present invention relates to the treatment of contaminated effluent from metal processing operations.

In the metal processing area, many techniques presently being utilized require wet processing. In particular, wet processing is found to be necessary in the manufacture of printed circuit boards, multilayer circuits, flexible circuits, chassis plating, and even the production of memory cores. Associated with the wet processing is the problem of handling the waste water resulting therefrom. This problem has become more severe with stringent local and federal legislation, which regulate the dumping of waste water thereby requiring highly efficient systems for effluent treatment.

The question of how to handle such a problem becomes even more difficult when quantities of water used in such wet processing systems for metal processing run in magnitudes in the area of 100 gallons of water per minute, roughly involving handling approximately 50,000 gallons of water each day. In attempting to solve this problem, many techniques have been devised within the last few years which are directed to the reusing of the water. Most of these techniques in the metal processing area involves re-circulating the water obtained through reverse osmosis techniques, where all the contaminated water is routed through a central stream in which, through evaporation techniques, the contaminants are separated from the main stream and reduced to sludge solids which are easily disposed of. In a few exceptional instances, because of the hazards of some contaminants e.g. chrome or cyanide wastes, specific treatments for reclaiming these specific contaminants are separately effected.

Such systems, in general, have been found to be quite inefficient in the handling of feeding concentrated streams directly to the evaporated stage. The inefficiencies involved include intermediate stages used prior to the evaporator stage for handling sludge due to the heavy concentration of contaminants. In addition, a heavy burden is placed on reverse osmosis membranes and filters, resulting in their frequent replacement and/or cleaning.

In order to overcome the disadvantages of such prior art systems, there is shown a more efficient system for use in metal processing systems which not only provides for more efficient handling of the contaminated water, but in addition, increases the life of reverse osmosis membranes and reduces maintenance efforts on the membranes and replacement of conventional filter units. In providing such advantages, an economic benefit is gained by significantly reducing the costs in running such an improved system. This is attained while still achieving recycling of better than 90 percent of the water being used in the metal processing operation.

SUMMARY OF THE INVENTION

The present invention provides for a water recycle treatment system for use in a metal processing operation having a plurality of concentrated solutions and rinse baths, which is accomplished by use of two main sub-systems for treating the concentrated solution and the rinse tank contaminated fluids. In such a system, the contaminated solutions from the process tanks are of a smaller volume having a higher degree of contamination are treated differently from the greater volume of rinse water having a less amount of contamination. As a consequence of the separate treatment, a first sub-system removes smaller concentrations from larger volumes which classifies it as one preferably requiring a reverse osmosis technique while the second sub-system dealing in heavy concentrates requires mixing, pH adjustment, and evaporation, it being a much slower process.

BRIEF DESCRIPTION OF THE DRAWINGS

FIG. 1 is a schematic diagram of the preferred embodiment of the invention essentially showing the manner in which water flow is operated on.

DESCRIPTION OF THE PREFERRED EMBODIMENT

Figure 1:
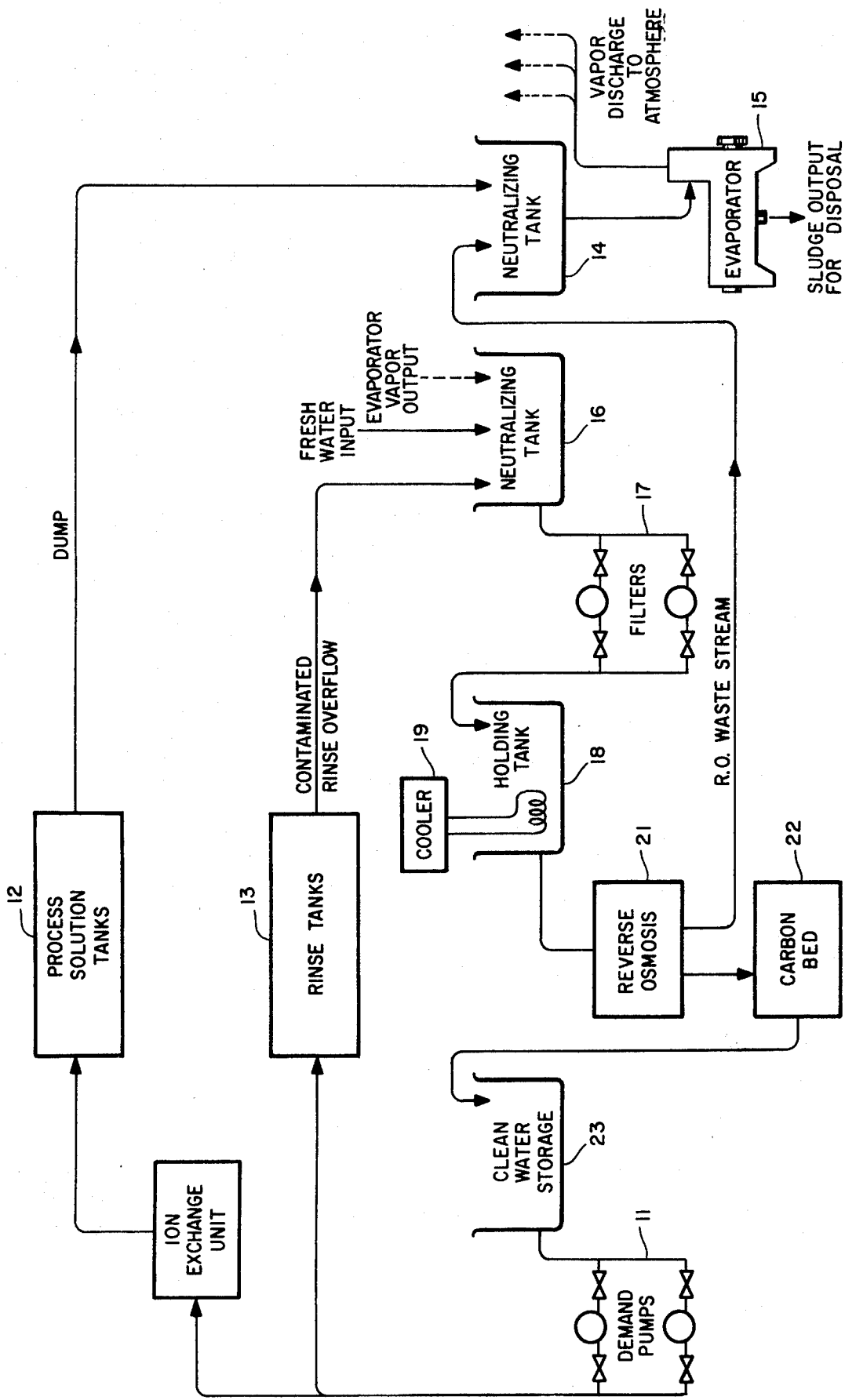

With reference to the drawings, there is shown in FIG. 1 the demand pumps 11 for pumping clean water through two separate streams into process solution tanks 12 and rinse tanks 13, which together make-up a metal processing operation for which the present water recycle treatment system is designed. Although in the embodiment of the present invention shown, the flow volumes through the process solution tanks are about 2 percent and flow volumes through the rinse tanks are about 98 percent, it should be understood a high degree of efficiency may still be attained within the framework of the present invention if the flow volumes are less than 10 percent and greater than 90 percent respectively.

In the stream leading to the process solution tank 12, there is included an ion exchange unit containing ion exchange resins for polishing the critical process solution make-up water for critical baths for maximum bath life. This polished water would be used, for example, in gold plating, paladium catalyst, or copper deposition baths. Otherwise, the water could be directly routed to process solution tanks 12 for non-critical baths as is depicted by the dashed flow line.

Due to contamination build-up, metal build-up, or chemical degradation, the process solutions are periodically dumped, for example, on a daily or weekly basis. In the present embodiment, the average daily dump, amounting to about 2 gallons per minute, is routed to a concentrate neutralizing tank 14 in which the pH is adjusted by use of, for example, caustic soda, sulfuric acid, etc. By adjustment of the pH, this helps to minimize corrosion of subsequent stainless steel equipment utilized. In the present embodiment, the subsequent equipment includes an evaporator 15 known as a Rototherm evaporator. The concentrated chemical waste from neutralizing tank 14 is fed into the evaporator 15 where water is vaporized for discharge into the atmosphere or reclamation, as desired, and where the balance components are ejected as sludge. The sludge output which contains, in a concentrated form, all the manufacture generated chemical waste may be disposed of in a variety of ways, including sanitary land fill, reclamation, or conversion to building materials.

A major portion of the flow from the demand pumps 11, roughly about 98 percent, is routed through a second stream which passes the clean water to the rinse tanks 13. With the delivery of fresh water, the rinse tanks 13 will overflow the contaminated rinse overflow being directed through troughs to a neutralizing tank 16 wherein the contaminated rinse overflow is neutralized by means of a pH controller and solution mixer by the use of acid or alkaline. This neutralization allows for constant pH feed to subsequent treatment units. In neutralizing the water in tank 16, fresh water make-up will be required to balance water lost through the process solution dumps and reverse osmosis waste stream. This water is provided through local water supply when a suitable level controller requires it.

The neutralized rinse water from the neutralizing tank 16 is then pumped through a filter bed 17 for removal of particulate matter. The filter bed material would be of the 30 micron and 10 micron size comprising, for example, of spiral wound cartridges of cotton fiber. Other types would include sand filters, disposable fabric, etc. After passing through the filter bed 17, the filtered water is collected in a holding tank 18 which serves as a reservoir for reverse osmosis processing and which includes a temperature controlling mechanism to maintain a temperature of the filtered water at less than 85° Fahrenheit to protect the membranes of the reverse osmosis unit. If desired, another filter of the 1 micron type might be inserted in the water flow path between the holding tank 18 and the reverse osmosis unit 21.

The reverse osmosis unit 21 is of a conventional type which pumps water through semi-permeable membranes which physically separate clean water from contaminants. Contaminants will be removed in a stream consisting approximately of 5 percent of the feed volume, with approximately 95 percent clean water passed through the membranes.

In the present embodiment where approximately 100 gallons per minute passes through the RO unit 21, a 5 gallon per minute waste stream is routed from the reverse osmosis unit 21 into the neutralizing tank 14 where it is treated in the same manner as the contaminated dump from the process solution tanks 12.

The 95 gallons per minute clean water flow is passed through a carbon bed 22 which will retain organics of small physical size that may have passed through the reverse osmosis membrane. Alternate examples of organic removal include hydrogen peroxide treatment, ultra-violet light and pasteurizing.

The organic-free cleaned water from the carbon bed 22 is discharged into a clean water storage tank 23 which serves as a reservoir for the demand pumps 11 to complete the recycling process providing for 95 percent recovery. The evaporator 15 discharge to the atmosphere may otherwise be reclaimed for recycling into the system by use of a cooling tower. The flow starts at the demand pumps 11, as earlier discussed, where constant pressure is maintained for water supply by means of a suitable pressure bypass back to the clean water storage tank 23.

Figure 2:
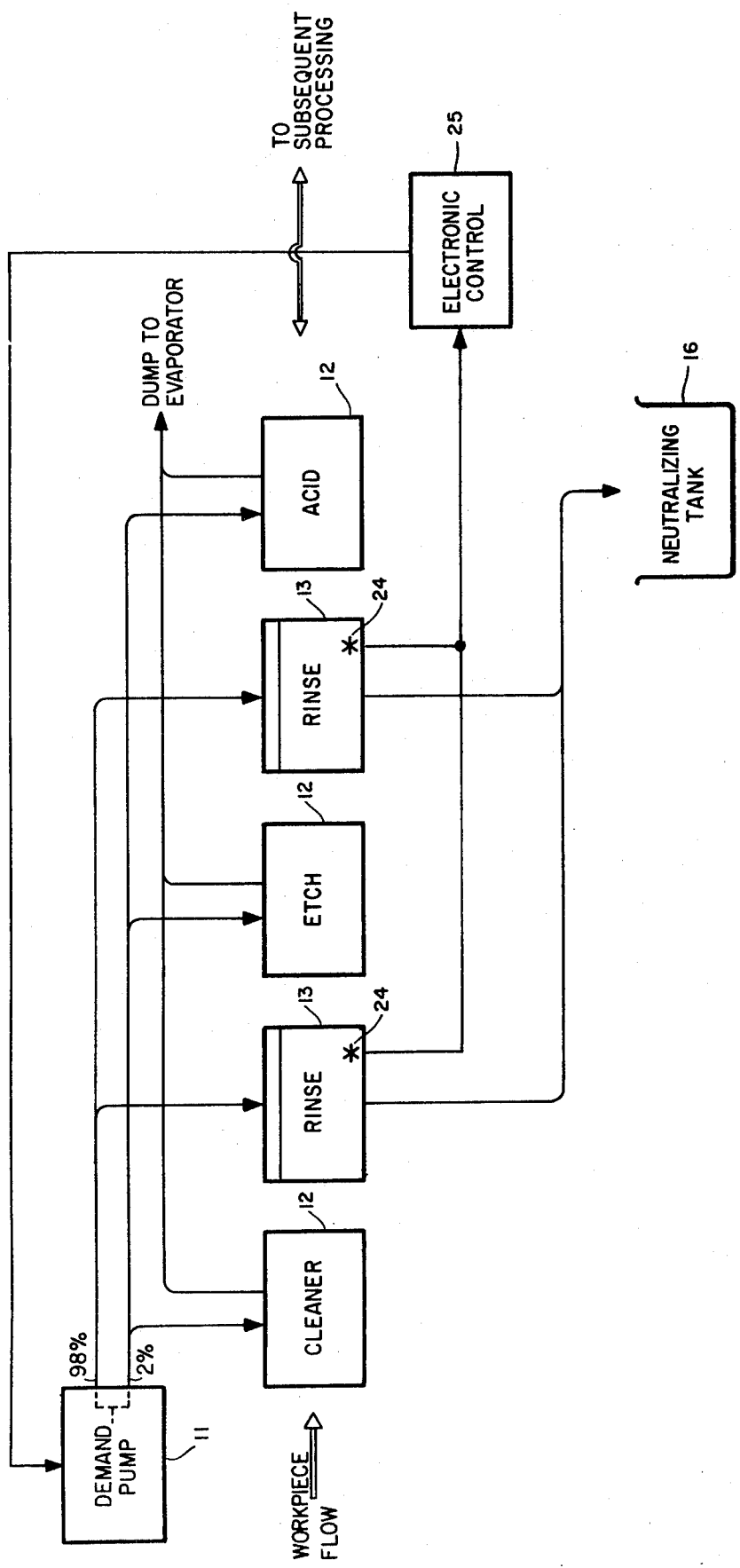
FIG. 2 is a schematic diagram showing the arrangement of the process solution tanks and rinse tanks with respect to workpiece flow through a typical portion of a chemical processing line.

With reference to FIG. 2, there is shown the arrangement of the processing solution tanks and rinse tanks with respect to the processing of the metal workpiece being passed therethrough. Specifically, in the present embodiment, the workpiece is first passed through a process tank 12 having a cleaner such as an alkali for cleaning surface dirt, then it is subjected to a first rinsing action to further remove any residue cleaner. The workpiece is then passed through an etch tank 12 having an etch such as ammonium persulfate which attacks the copper condition (or other prescribed metal condition) for further cleaning the workpiece and then on to subsequent chemical baths for appropriate process sequence as determined by the objective (e.g. electroless plating, electroplating, anodizing, conversion coating, etc.). The choice of chemicals and the sequence will vary according to the process used.

As shown, each of the rinse tanks 12 include a conductivity probe 24 permanently immersed in each rinse tank and electrically connected to an electronic monitor 25 for constant monitoring of the solution conductivity. Electrical control is set at a suitable predetermined value having a trigger point such a approximately 10 percent higher in conductivity than the local water supply. In the enclosed embodiment, the trigger point might be at $140\mu$ mhos where the incoming water is at $130\mu$ mhos. When the conductivity setting is exceeded, the electronic control 25 generates a signal which caused the demand pumps, by a suitable control value, to supply clean water to the rinse tanks until the conductivity drops below the trigger point value. The overflow from the rinse tanks, caused by the added water input, falls into a trough and is routed via suitable drain pipes to the neutralizing tank 16.

What is claimed is:

1. In a system for processing a metal workpiece such as a printed circuit board, having at least two or more separate chemical process solution bath tanks and rinse tanks through which the workpiece is passed, a technique for water treatment and reuse where the volume of water flow through the rinse tanks is at least nine times the volume of water flow through the chemical process solution bath tanks comprising the steps of:

providing a first flow path for contaminated water, comprising of a contaminating element including metal build-up derived from said rinse tanks and a second flow path for contaminated solution including metal build-up derived from said chemical process bath tanks;

treating the contaminated water in the first flow path to separate the contaminating element from said rinse tank contaminated water to produce clean water;

routing the separated contaminating element and the contaminated solution in said second flow path into at least one (a) common neutralizing tank wherein said contaminating element is neutralized;

separating the neutralized contaminating element and contaminated solution, to provide water vapor and sludge outputs; and pumping said clean water back to said rinse tanks and process tanks.

2. In a system according to claim 1 wherein the separating includes the step of evaporation.

3. In a system according to claim 1 wherein the treating of the contaminated water in the first flow path comprises:

providing a second neutralizing tank for adjusting the pH of the rinse tank contaminated water, and;

passing the neutralized rinse tank contaminated water through a reverse osmosis treatment to separate the contaminating element from the rinse tank contaminated water to produce clean water.

4. In a system according to claim 3 wherein the treating of the contaminated water in the first flow path further comprises passing the clean water through a carbon bed to entrap minute organic particles.

5. In a system according to claim 3 including:
supplying fresh make-up water upon demand to said second neutralizing tank.

6. Apparatus for water reuse in a system for processing a workpiece such as a printed circuit board, having separate chemical process solution bath tanks and rinse tanks through which the workpiece is passed where the volume of water flow through the rinse tanks is at least nine times the volume of water flow through the chemical process solution bath tanks comprising:
flow means defining distinct first and second flow paths for the rinse tank contaminated water comprising of a contaminating element including metal build-up and chemical process bath tank contaminated solution including metal build-up, respectively;
treating means in the first flow path for providing a contaminating element output and a clean water output;
neutralizing tank means for receiving the process contaminated solution and contaminating element output;
evaporating means for turning the contents from the neutralizing tank means into a vapor and sludge outputs;
pump means for supplying said clean water output back to said process tanks and rinse tanks, and;
said treating means including second neutralizing means for adjusting the pH of the rinse tank contaminated water, means for supplying make-up water to said neutralizing means, and reverse osmosis means for receiving the contaminated water from said second neutralizing means for separating the contaminating element from the rinse tank contaminated water.

7. Apparatus according to claim 6 wherein said treating means further comprises carbon bed means for entrapping minute organic particles in the clean water output.

8. Apparatus according to claim 6 including:
means for routing the vapor output to said second neutralizing means.

* * * * *